United States Patent [19]

Rauschenbach

[11] Patent Number: 5,179,834
[45] Date of Patent: Jan. 19, 1993

[54] METHOD FOR SETTING THE DESIRED CLOSURE TRAVEL OF A HYDRAULIC CYLINDER CONTROL VALVE

[75] Inventor: Reinhard Rauschenbach, Langen, Fed. Rep. of Germany

[73] Assignee: Alfred Teves GmbH, Frankfurt am Main, Fed. Rep. of Germany

[21] Appl. No.: 683,398

[22] Filed: Apr. 10, 1991

[30] Foreign Application Priority Data

Apr. 12, 1990 [DE] Fed. Rep. of Germany ....... 4011816

[51] Int. Cl.⁵ ............................................. F16D 31/00
[52] U.S. Cl. ........................................ 60/327; 60/533; 60/562; 60/589; 91/471
[58] Field of Search .................. 60/585, 588, 589, 562, 60/327, 721, 533, 566; 91/471

[56] References Cited

U.S. PATENT DOCUMENTS

| | | | |
|---|---|---|---|
| 4,709,551 | 12/1987 | Saalbach et al. | 60/589 |
| 4,773,224 | 9/1988 | Sakamoto et al. | 60/589 |
| 4,794,757 | 1/1989 | Schluter | 60/562 |
| 4,858,437 | 8/1989 | Ochiai | 60/589 X |
| 4,885,910 | 12/1989 | Resch | 60/562 |
| 4,939,901 | 7/1990 | Saalbach et al. | 60/562 |
| 5,005,350 | 4/1991 | Reinhartz et al. | 60/589 X |
| 5,014,514 | 5/1991 | Reinhartz et al. | 60/588 X |
| 5,016,520 | 5/1991 | Gantier | 91/471 |
| 5,036,751 | 8/1991 | Seip et al. | 60/533 X |

FOREIGN PATENT DOCUMENTS

| | | |
|---|---|---|
| 2712050 | 9/1977 | Fed. Rep. of Germany . |
| 3424513 | 1/1986 | Fed. Rep. of Germany . |
| 3627000 | 2/1988 | Fed. Rep. of Germany . |
| 3633217 | 9/1988 | Fed. Rep. of Germany . |
| 3815768 | 11/1989 | Fed. Rep. of Germany . |
| 0135364 | 10/1981 | Japan ........................................ 60/585 |

Primary Examiner—Edward K. Look
Assistant Examiner—Todd Mattingly
Attorney, Agent, or Firm—Robert P. Seitter; J. Gordon Lewis

[57] ABSTRACT

A setting method for minimizing the closure travel of a central valve in a master cylinder is proposed, wherein, after the assembly of all internal parts except the stop (10), the internal parts having a position which corresponds to the inoperative position, the distance (y) between that end of the axial extension (12) which is on the actuating side and a fixed point is measured and wherein then, in dependence upon the measured distance (y) a stop (10) is chosen such that the desired closure travel (x) between the closing body (13) and the valve seat (14) of the central valve is established. By means of said method the closure travel of the central valve (x) is exactly adjustable irrespective of the tolerances of other component parts or a preceding power booster.

6 Claims, 2 Drawing Sheets

1

METHOD FOR SETTING THE DESIRED CLOSURE TRAVEL OF A HYDRAULIC CYLINDER CONTROL VALVE

BACKGROUND OF THE INVENTION

The present invention relates to a method for setting the desired closure travel between a closing body and its valve seat in a central valve arranged in a piston of a master cylinder, the closing body abutting, in the inoperative position, with an axial extension against a positive stop. A thusly designed master cylinder with central valve is described, for instance, in the German printed and published patent application DE-OS 36 27 000. The closure travel of the central valve of an aforementioned master cylinder has normally been set such that after the assembly of all internal parts of the master cylinder, a functional dimension is set between a flange at the cylinder housing and the point of application of force of the actuating member of the pedal and/or power booster by inserting spacer discs. Said setting method is disadvantageous in that when designing the closure travel of the central valve the tolerances of the functional dimension and of the preceding power booster must be taken into account since it must be ensured that the central valve is open in the inoperative position since otherwise a residual pressure can remain in the hydraulic circuit.

BRIEF DESCRIPTION OF THE INVENTION

It is the object of the present invention to describe a setting method whereby it will be possible to set a master cylinder with a minimal closure travel, whereby other tolerances need not be taken into account and whereby it is ensured, nevertheless, that the central valve is maintained open in the inoperative position.

This object is achieved by a method in which firstly all internal parts of the master cylinder except a valve axial extension stop are mounted, in that, subsequently, the distance y between end of the axial extension, which end is on the actuating side, and a master cylinder housing fixed point is measured, with the internal parts in a position which corresponds to the inoperative retracted position of the master cylinder aul, a stop pin is selected in dependence upon the measured distance y such that the desired closure travel x is established, and thereafter installed bearing against the fixed point in the housing.

DETAILED DESCRIPTION OF THE INVENTION

In the following, only those component parts of the master cylinder which are required for the explanation of the setting method will be described. In all Figures, like reference numbers have been used for like parts.

Figure 1:
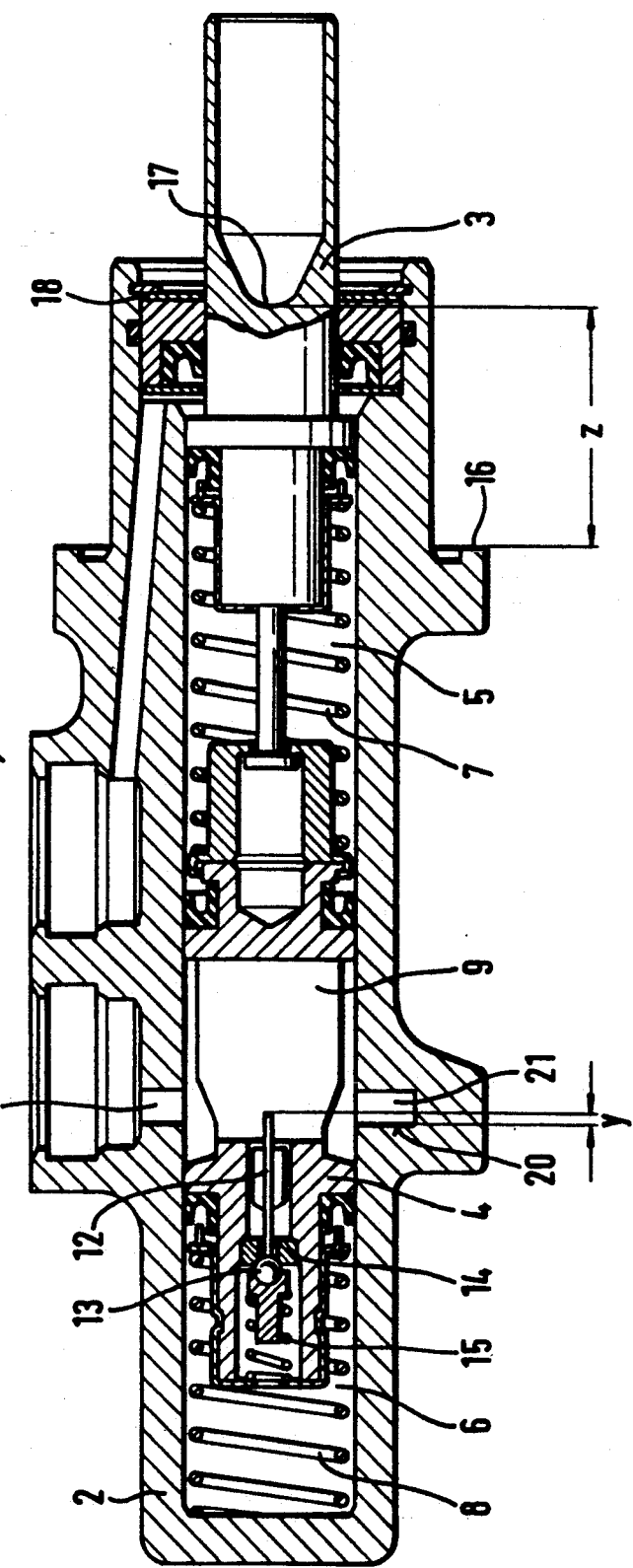
FIG. 1 shows an axial section through a master cylinder after the assembly of all internal parts except the stop.

FIG. 1 shows a master cylinder 1 with a housing 2 wherein a push rod piston 3 and a floating piston 4 are axially displaceably arranged. The pistons 3, 4 and the housing 2 define two pressure chambers 5, 6. In each of the pressure chambers 5, 6 a piston return spring 7, 8 is arranged. In the following, the floating piston circuit in particular will be looked at in order to demonstrate the setting method according to the invention. It will be irrelevant whether the push rod circuit is maintained unpressurized in the inoperative position by means of a central valve or a compensation bore.

Figure 2:
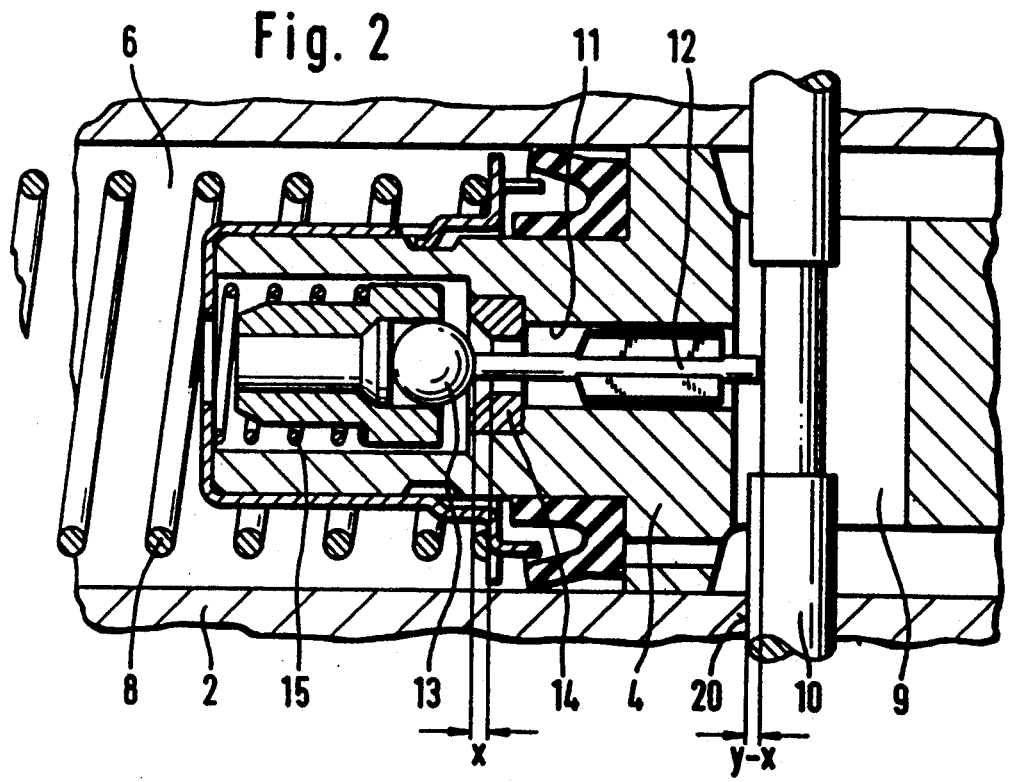
FIG. 2 shows the surroundings of the central valve, enlarged in the axial section, after the assembly of the pin serving as a stop.

The floating piston 4 has a recess 9 which permits a displacement of the floating piston 4 with a stop pin 10 installed (FIG. 2). An axial extension 12 of the closing body 13 of the central valve protrudes into an axial bore 11 (FIG. 2) in the floating piston 4, the axial bore opening into the recess 9. An associated valve seat 14 is inserted in the floating piston 4. In FIG. 1, the closing body 13 is urged against the valve seat 14 by means of the central valve spring 15 since the pin 10 has not been mounted yet.

Due to the force of the piston return springs 7 and 8, both pistons 3 and 4 are displaced to the right when moving to the inactive retracted condition of the master cylinder, as shown in FIG. 1, until the push rod piston 3 abuts against a stop disc 18. The retracted position of the floating piston 4 is determined by the ratio of the return spring forces.

Figure 3A:
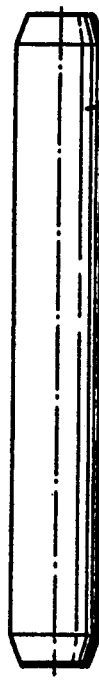
FIG. 3 shows a variety of stop pins.
Figure 3B:
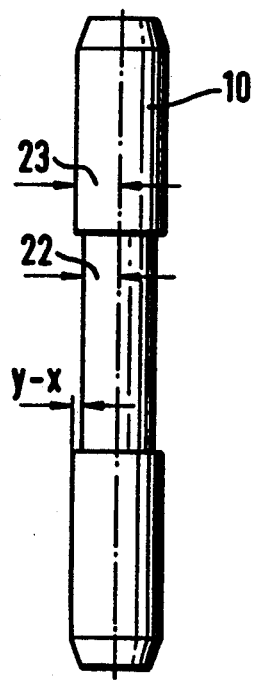
Figure 3C:
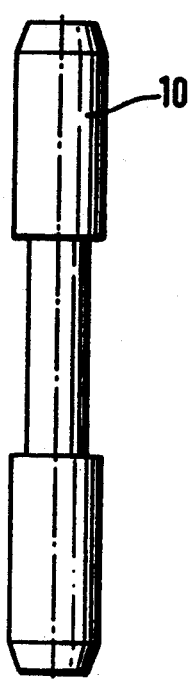

In the position corresponding to the retracted position of the brakes (see below), the distance y between the right end (on the actuating side), as shown in FIG. 1, of the axial extension 12 and a fixed point is measured. Expediently, the fixed point is the left edge 20, as shown in the FIG. 2, of a bore 21 designed to receive the stop pin 10 serving as a stop. The distance y is measured with the central valve (13, 14) being closed, i.e., the axial extension 12 must be displaced by engagement with the stop pin 10, after the master cylinder 1 has been mounted, by exactly the dimension x so that the desired closure travel x between closing body 13 and valve seat 14 is established. A selected pin 10 is mounted to cause this travel as the pistons 3, 4 move to the retracted position. It is particularly advantageous when a variety of pins 10 is available which differ from each other in that they have different diameters in the area where the axial extension, 12 abuts. Pins 10 whose thicknesses differ preferably in the middle, are shown in FIG. 3.

The closure travel x is caused by setting the radius 22 of the central area of the pin 10, against which area the axial extension 12 abuts, to be smaller by the dimension y-x than the fall radius 23 the pin 10 occupying the bore 21 in the housing 2 which forms the fixed point 20. This is shown in FIGS. 2 and 3.

The master cylinder 1 is set in a, condition corresponding to the retracted position of the brakes. In general, this condition does not simply correspond to the position into which the pistons 3, 4 are urged by means of the piston return springs 7, 8 since, normally, the power booster and/or pedal linkage slightly loads the pistons 2, 4 in the direction of actuation. A simple possibility to predetermine the inoperative retracted position nevertheless consists in that the setting dimension z between a mounting flange 16 at the master cylinder 1 and the point of application of force 17 of an actuating member, now shown in FIG. 1, is set by placing a master cylinder in a fixture apparatus (not shown). Different master cylinder types can be mounted and set by adjusting the fixture apparatus.

A second possibility to achieve a position of the pistons 3 and 4 which corresponds to the inoperative retracted position of the brakes consists in that a power booster is flange 16 mounted on the master cylinder 1.

The stop 10 is mounted after the mounting of the power booster, as has been described above.

A particularly favorable power booster to be used is a vacuum power booster whose working chambers are both evacuated during the setting operation. The latter ensures that a possible contraction of the booster housing in the event of a vacuum in its interior no longer influences the closure travel x during brake operation.

What is claimed is:

1. A method for setting a desired closure travel between a closing body and an associated valve seat in a central valve disposed in a piston displaceable in a housing of a brake master cylinder, the closing body but not the piston abutting a stop with the piston moving to a retracted position in said brake master cylinder housing as said master cylinder assumes an inoperative condition, through contact of said stop with a tip of an axial extension of said closing body, said axial extension extending axially opposite the direction of movement of said piston upon actuation of said master cylinder, said method including the steps of assembling substantially all the internal parts of said master cylinder including said piston except said stop, measuring the distance between said tip of said axial extension and a fixed point on said master cylinder housing against which said stop is to be axially located, with the internal parts caused to assume positions corresponding to said inoperative condition of said master cylinder, in which said piston moves to said retracted position, and selecting a stop having a characteristic dimension between the points of contact with said extension and said fixed point which is a function of said measured distance such that the desired closure travel of said closing body is established after installation of said stop in said housing located against said fixed point by abutment of said tip of said axial extension but not said piston against said stop.

2. The method according to claim 1, further including the steps of steps of configuring said stop in the form of a cylindrical pin and said point as one side of a bore formed transversely across said housing.

3. The method according to claim 2 further including the step of selecting said pin from a plurality of stepped diameter pins each having different diameters at a point of contact with said axial extension.

4. A method for setting a desired closure travel distance x between a closing body and an associated valve seat defining a central valve disposed in a piston displaceable to a retracted position in said housing which is not positively fixed in a housing of a brake master cylinder, said piston displacement moving said valve body against a stop but without contact of said piston with said stop, said valve body thereby moved off of said valve seat upon said piston moving to a retracted position, said method comprising the steps of:

preassembling substantially all internal parts of said master cylinder with the exception of said stop;

positioning said internal components to correspond with an inoperative condition of said master cylinder whereat said piston is at said retracted position in said housing;

with said piston in said retracted position, measuring the distance y between a first point defined by the position of said closing body with said internal components in said inoperative condition and a second point defined by a fixed location on a said master cylinder housing;

installing said stop in a recess in said housing in contact with said closing body and said fixed location; and configuring said stop with an axial distance between said respective points of contact equal to y-x, said closing body engaging said stop to thereby be caused to shift said predetermined distance x when said piston moves to said retracted position, said piston not contacting said stop when in said inoperative condition.

5. The method of claim 4, further including the step of forming said closing body with an axial extension extending in the direction of retracting displacement of said piston, an end of said extension defining said first measurement point.

6. The method of claim 4, wherein said inoperative condition of said master cylinder constitutes the collective position assumed by said internal parts when said cylinder is installed in an operational hydraulic system, but with no axial actuation forces applied thereto.

* * * * *